(12) United States Patent
Kumar

(10) Patent No.: US 12,715,299 B2
(45) Date of Patent: Aug. 25, 2026

(54) POWERED SYSTEM CONTROL SYSTEM AND METHOD

(71) Applicant: Transportation IP Holdings, LLC, Norwalk, CT (US)

(72) Inventor: Ajith Kuttannair Kumar, Ashburn, VA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 91 days.

(21) Appl. No.: 18/437,374

(22) Filed: Feb. 9, 2024

(65) Prior Publication Data

US 2024/0383338 A1 Nov. 21, 2024

Related U.S. Application Data

(60) Provisional application No. 63/502,510, filed on May 16, 2023.

(51) Int. Cl.
*B60L 3/04* (2006.01)

(52) U.S. Cl.
CPC .................................... *B60L 3/04* (2013.01)

(58) Field of Classification Search
CPC .... B60L 3/04; B60L 2200/26; B60L 2240/12; B60L 2240/22; B60L 2240/547; B60L 2240/549; B60L 2240/622; B60L 2240/642; B60L 2250/10; B60L 3/0046; B60L 3/0092; B60L 3/12; B60L 50/60; B60L 50/66; B60L 3/0007; B60L 58/10; B60L 58/18; B61L 15/0081; B61L 27/57
See application file for complete search history.

(56) References Cited

U.S. PATENT DOCUMENTS 6,998,727 B2 * 2/2006 Gray, Jr. ............... B60W 10/08 290/51
10,046,766 B2 8/2018 Lavertu et al.
11,485,394 B2 11/2022 Ravi et al.
12,110,025 B1 * 10/2024 Madhani ............. B60W 10/184
2009/0223726 A1 * 9/2009 Jeon ...................... B60L 3/0053 180/65.285
2011/0095603 A1 * 4/2011 Lee ......................... B60L 50/51 307/10.1
2018/0026539 A1 * 1/2018 Kobayashi ........... G01R 19/165 323/271
2018/0124244 A1 * 5/2018 Lee ....................... H04W 48/14
2019/0181664 A1 6/2019 Yugou et al.
2020/0001857 A1 1/2020 Naylor et al.
(Continued)

FOREIGN PATENT DOCUMENTS

CA 3199860 A1 6/2022

OTHER PUBLICATIONS

European Search Report dated Sep. 30, 2024 for corresponding European Patent Application No. 24170226.5.

*Primary Examiner* — Ashley L Redhead, Jr.
(74) *Attorney, Agent, or Firm* — K&L Gates LLP

(57) ABSTRACT

A system and method includes identifying one or more operating conditions of a vehicle based at least in part on data received from one or more sensors, and determining whether a change in the one or more operating conditions of the vehicle indicates an event involving the vehicle. A responsive action involving one or more onboard power sources of the vehicle is initiated responsive to determining the occurrence of the event.

17 Claims, 6 Drawing Sheets

(56) References Cited

U.S. PATENT DOCUMENTS

| | | | | |
|---|---|---|---|---|
| 2020/0148201 | A1* | 5/2020 | King | G05D 1/0221 |
| 2021/0188093 | A1 | 6/2021 | Gyani | |
| 2023/0095539 | A1* | 3/2023 | Gordon | G08G 1/0129 701/96 |
| 2023/0271504 | A1 | 8/2023 | Wan et al. | |
| 2023/0373312 | A1* | 11/2023 | Cho | B60L 7/26 |
| 2024/0131936 | A1* | 4/2024 | Kumar | B60L 1/20 |

* cited by examiner

POWERED SYSTEM CONTROL SYSTEM AND METHOD

CROSS-REFERENCE TO RELATED APPLICATIONS

This application claims priority to U.S. Provisional Application No. 63/502,510, filed on 16 May 2023. The entirety of this application is incorporated herein by reference.

BACKGROUND

Technical Field

The subject matter described herein relates to powered system control systems and methods of controlling operation of powered systems.

Discussion of Art

Electric powered systems, such as electric vehicle systems, may be powered by electric current that is stored onboard the electric vehicle systems. For example, the electric vehicle system may include plural power sources such as battery packs and/or other electric power storage devices. The battery packs may receive electric current from onboard sources (e.g., an alternator or generator) and/or from off-board sources (e.g., a charging station electrically coupled with the battery packs, a catenary line, an electrified third rail, or the like). The power sources may receive and store the electric current, and provide the electric current to one or more systems of the vehicle system, such as a propulsion system, an auxiliary system, a braking system, or the like.

While the vehicle system is operating, an event may occur that may compromise the power sources (or other components of the vehicle system, such as components of a thermal management system of the vehicle system). For example, during a coupling event between two vehicles, one vehicle may collide with the other vehicle (or other objects) at a rate of speed that exceeds a threshold, and may cause a mounting structure of one or more of the power sources to fail or break. If an operator is onboard the vehicle system during the time of the event, the operator may recognize that the vehicle system was subject to the additional forces that may have caused the power sources to be compromised. However, if an operator is not onboard the vehicle, does not witness or see the event, and/or does not recognize the impact on different equipment onboard, the compromised state of the power sources may not be acknowledged. If the power sources have been compromised during an event but are not inspected and/or repaired, the life of the power sources may be shortened, the power sources may fail to operate correctly or efficiently, or the like.

It may be desirable to have a system that monitors operating conditions of a vehicle system and identifies the occurrence of an event in a manner that differs from those that are currently available.

BRIEF DESCRIPTION

In accordance with one example or aspect, a method includes identifying one or more operating conditions of a vehicle based at least in part on data received from one or more sensors, and determining whether a change in the one or more operating conditions of the vehicle indicates an event involving the vehicle. A responsive action involving one or more onboard power sources of the vehicle is initiated responsive to determining the occurrence of the event.

In accordance with another example or aspect, a system includes a controller having one or more processors to control operation of a vehicle. The controller identifies one or more operating conditions of the vehicle based at least in part on data received from one or more sensors. The controller determines whether a change in the one or more operating conditions of the vehicle indicates an event involving the vehicle. The controller initiates a responsive action involving one or more onboard power sources of the vehicle responsive to determining the occurrence of the event.

In accordance with another example or aspect, a method includes identifying an occurrence of an event to a vehicle configured to move along a route. The vehicle includes one or more onboard electric power sources. The event may be an impact event, a derailment event, and/or a flooding event. A responsive action is determined responsive to identifying the occurrence of the event. The responsive action includes one or more of an inspection or maintenance to the one or more onboard electric power sources.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to a powered system, and monitoring and/or controlling operations of the powered system responsive to identifying the occurrence of an event. A suitable powered system may be a vehicle system, and the event may be an impact event (e.g., in which a vehicle collides with another vehicle or another object), a derailment event (e.g., in which a vehicle derails from or comes off from the track along which the vehicle system moves), a flooding event (e.g., in which the powered system collects and/or is exposed to a volume of water or other fluids), or the like. The occurrence of the event, or a magnitude of the event, may compromise one or more components and/or systems of the powered system. For example, an impact event may compromise and/or cause failure to a mounting structure of a power source onboard the powered system, electrical couplings (e.g., between two or more power sources, between a power source and a traction motor, or the like), coolant connections (e.g., between components of a thermal management system of the powered system), or the like. As another example, a flooding event may cause one or more of the power sources and/or other electrical components of the powered system to short.

A controller of the powered system receives sensed data from the one or more sensors onboard and/or off-board the powered system, and monitors operating conditions of the powered system or changes in the operating conditions based at least in part on the sensed data. The sensors may already be established to monitor operating conditions of the powered system (e.g., accelerometers, global positioning system sensors, speed sensors, temperature sensors, impact sensors, or the like).

The controller monitors the sensed data, and determines if an event or a series of events has occurred based on the operating conditions of the powered system, and/or changes in the operating conditions of the powered system. If the controller determines that an event has occurred, the controller selects and/or initiates a responsive action to take. One or more different responsive actions may be selected and/or initiated based on the type of the event that has occurred, a magnitude of the event, a number of previous events that have occurred, or the like.

Figure 1:
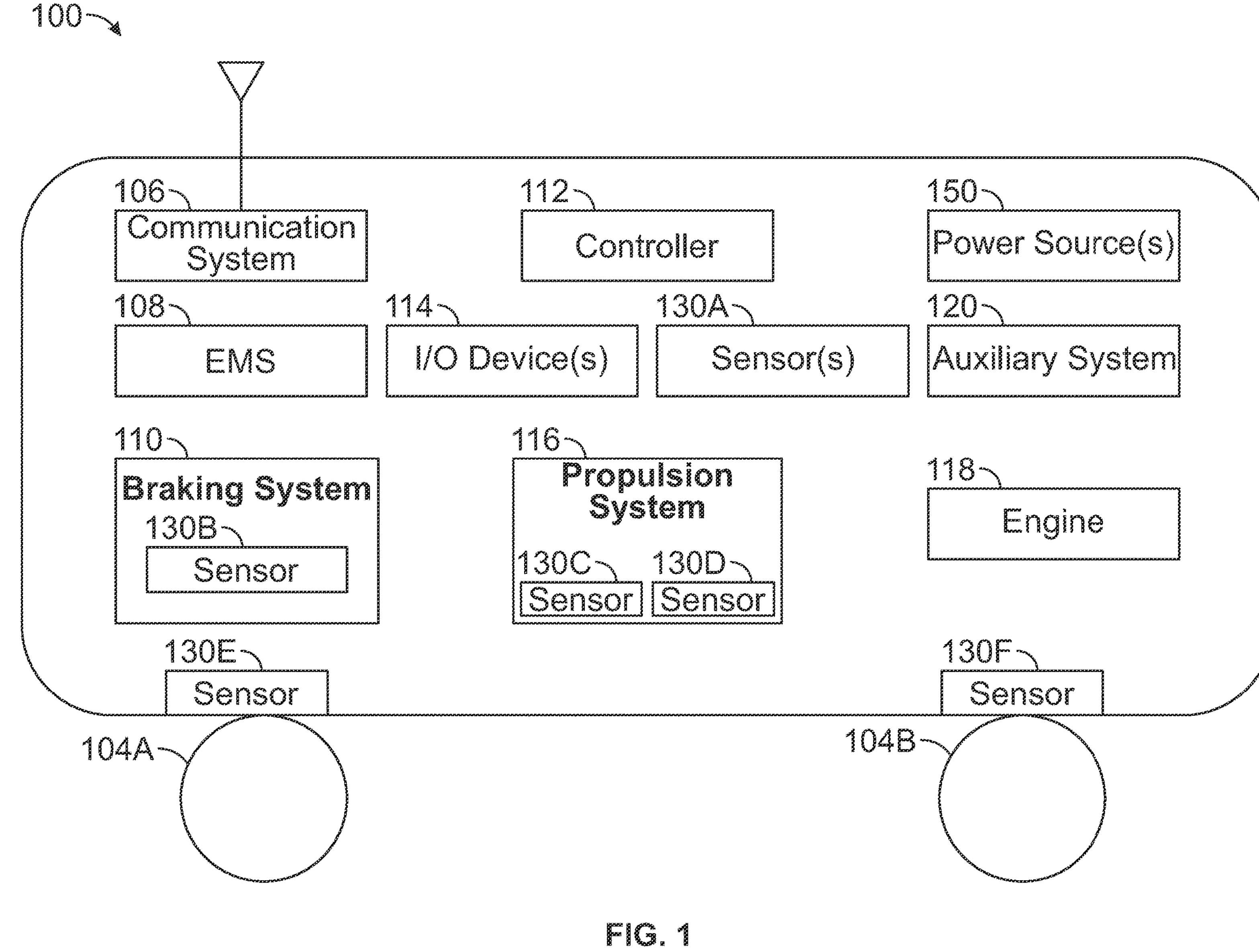
FIG. 1 illustrates a schematic of a powered system, in accordance with one embodiment.

FIG. 1 illustrates a powered system 100, in accordance with one embodiment. The powered system may be a vehicle, such as a rail vehicle, an automobile, a truck (with or without a trailer), a bus, a marine vessel, an aircraft, a mining vehicle, an agricultural vehicle, or other off-highway vehicle. Optionally, the powered system may be a non-vehicle and/or a stationary powered system, such as a wind-powered turbine, manufacturing machinery, power generating systems, or the like.

In the illustrated embodiment of FIG. 1, the powered system is a vehicle, such as a propulsion-generating vehicle. The propulsion-generating vehicle may be part of a vehicle system that is formed by a single vehicle or multiple vehicles, and optionally an operating system may extend between two or more of the multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

The powered system includes a controller 112 that represents hardware circuitry having and/or connected with one or more processors, such as one or more microprocessors, field programmable gate arrays, integrated circuits, and/or the like. In one embodiment, the controller can represent an engine control unit. The controller may include a single processor or multiple processors. All operations can be performed by each processor, or each processor may perform at least one different operation than one or more (or all) other processors.

The controller controls operations of the powered system, such as by controlling tractive efforts and/or braking efforts provided by a propulsion system 116 and braking system 110. The controller may be manually operated by receiving instruction signals from input/output devices 114 (shown as the "I/O Devices" in FIG. 1) that can represent a touchscreen, a joystick, a keyboard, a switch, a wheel, a microphone, a display, a monitor, a speaker, a light, or the like.

The powered system includes a communication system 106 that represents transceiving hardware (e.g., antennas, wires, cables, modems, codecs, or the like) that wirelessly communicate signals or communicate signals described herein via wired connections. The communication system may communicate with other vehicles of the vehicle system, may communicate with other vehicle systems that are separate from the powered system, may communicate with an off-board controller (not shown), may communicate with wayside devices, or any combination therein.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the powered system executes that plan to achieve the desired input data to mirror the predicted best outcome scenario. Additionally, the success metric may be a combination of optimized outcomes, which may be weighed relative to each other.

The controller can use this artificial intelligence or machine learning to receive input (e.g., a location or change in location). The controller may receive additional input of the change in operating mode that was selected, such as analysis of noise or interference in communication signals (or a lack thereof), operator input, or the like, which indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

In one or more embodiments, the controller may be automatically operated to autonomously control operation of the powered system. For example, control settings (e.g., control settings associated with a trip plan that provides designated operational settings for the power setting as a function of time or distance along a route for a trip of the powered system to a destination location) may be provided by an energy management system 108 to the controller and/or may be stored in a tangible and non-transitory computer readable storage medium, such as a memory (not shown). The controller and the energy management system may represent two or more control modules in one or more embodiments. Optionally, the controller may receive at least some of the designated operational settings from an off-board control system (not shown), may receive at least some operational settings from an operator manually controlling operation of the powered system, or the like. The energy management system may include one or more processors, microcontrollers, or other logic-based devices, and/or associated software or instructions, for carrying out one or more operations described herein.

The controller can communicate with an engine 118 of the powered system. The engine can be a fuel-consuming engine, such as a diesel engine. Not all embodiments of the inventive subject matter, however, are limited to diesel engines. The engine could represent another type of engine that consumes fuel other than diesel fuel, such as an engine that consumes fuel other than diesel, hydrogen, propane, or the like.

In one or more embodiments, the engine may also perform work such as rotating a shaft joined to a generator or alternator (not shown), which cause the generator or alternator to output electric current, that can be stored and/or provided to one or more powered components of the powered system, such as a propulsion system 116 and/or an auxiliary system 120. The propulsion system can represent one or more engines, alternators, generators, motors, or the like, that propel the vehicle (and vehicle system). The propulsion system can include plural wheels 104A, 104B that are controlled by the propulsion system to move the vehicle along a route. In the illustrated side view of the vehicle shown in FIG. 1, two wheels are illustrated, and are operably coupled with two corresponding wheels disposed on the other side of the vehicle (not shown). The vehicle may include a braking system 110 that may be controlled to control movement of the powered system to slow or stop movement of the powered system. The braking system can include air brakes, friction brakes, motors (e.g., used for dynamic and/or regenerative braking), or the like.

The auxiliary system can represent one or more other loads that consume at least some of the current that is output by the generator or alternator, but not for propulsion of the powered system. For example, the auxiliary system can represent motors (e.g., hydraulic and/or linear motors that control movement of a vehicle frame system), fans (e.g., blowers that cool parts of the propulsion system, blowers that cool braking resistors, pumps that force coolant to cool the engine or other components, etc.), heating and/or cooling systems that heat or cool an operator cab of the vehicle system, or the like.

In one or more embodiments, the propulsion system, the auxiliary system, and/or the braking system may be powered by the electric energy (e.g., electric current, such as the electric current generated by the generator or alternator). The electric current may be stored onboard the powered system in one or more power sources 150 and/or onboard energy storage devices (not shown). The power source(s) can represent one or more fuel cells, batteries, or the like. The onboard energy sources may include the generator and/or alternative, one or more solar cells, wind turbines, or the like. In another example, the onboard energy source(s) may include traction motor(s) of the propulsion system when the traction motors operate in a dynamic braking mode where electric energy is generated by the traction motors during slowing of the powered system. At least some electric energy generated by the dynamic braking can be provided to the onboard energy storage devices or power sources for storage.

While the power sources (e.g., the energy storage devices) are shown as being disposed onboard the powered system, alternatively the power sources may be disposed onboard another powered system, such as another vehicle in the vehicle system that is coupled with the powered system 100. For example, the power sources may be located on an energy tender vehicle (not shown) that is connected with the vehicle 100 by one or more mechanical connections such that movement of the vehicle also moves the tender vehicle. Such a power source can be connected with the propulsion system of the vehicle by one or more conductive bodies (e.g., buses, cables, wires, or the like).

One or more sensors 130A-F of the powered system may sense characteristics of operation of the powered system and/or an environment in which the powered system is operating. The sensors can output signals (e.g., wireless signals and/or signals that are conducted via one or more conductive pathways such as wires, cables, buses, etc.). Optionally, the one or more sensors may sense characteristics of various systems and/or components of the powered system. For example, the sensor(s) 130A can detect characteristics associated with the powered system and/or the environment in which the powered system operates, the sensor 130B can detect characteristics associated with the braking system, the sensors 130C, 130D can detect characteristics associated with the propulsion system, the sensor 130E can detect characteristics associated with the first wheel 104A and/or the axle to which the first wheel is coupled, and the sensor 130F can detect characteristics associated with the second wheel 104B and/or the axle to which the second wheel is coupled. The sensors can represent global positioning system (GPS) sensors, temperature and/or humidity sensors (e.g., that detect operating temperatures of systems and/or components of the powered system, that detect ambient temperatures of the environment, or the like), accelerometers (e.g., single-axis accelerometers, two-axis accelerometers, and/or three-axis accelerometers), speed sensors, inclinometers, impact sensors (e.g., air bag detection sensors), gyro sensors, cameras (e.g., cameras that capture still and/or video images), or the like. The sensors can sense characteristics of various systems and/or components of the powered system, such as positions of hydraulic and/or linear motors of the auxiliary system, characteristics and/or changes in characteristics of a route along which the powered system is moving, or the like.

In one or more embodiments, one or more sensors off-board or separate from the powered system may transmit sensed data associated with the vehicle to the controller onboard the powered system. For example, the powered system may move along a route and most past wayside devices, route directional control devices, intersections of other routes, or the like, that may include sensors. The off-board sensors may be impact and/or pressure sensors, and may sense a level and/or frequency of impacts made by the powered system moving along the route and may transmit the sensed data with the onboard controller. In another embodiment, the off-board sensor may be a speed sensor, and may sense a speed at which the powered system is moving past the speed sensor that is off-board the powered system.

As described herein, the controller may receive sensed characteristic signals (from onboard and/or off-board sensors), and may monitor the operation and/or environment of the powered system. Using this information, the controller can automatically change one or more operations of the powered system, such as, but not limited to, an operating speed of the engine, a brake setting, or the like.

The number of each of the components shown in FIG. 1 is used as one example. For example, multiples of the engine, the controller, the sensor(s), the generator, the alternator, and/or the propulsion system may be provided.

Figures 2, 3:
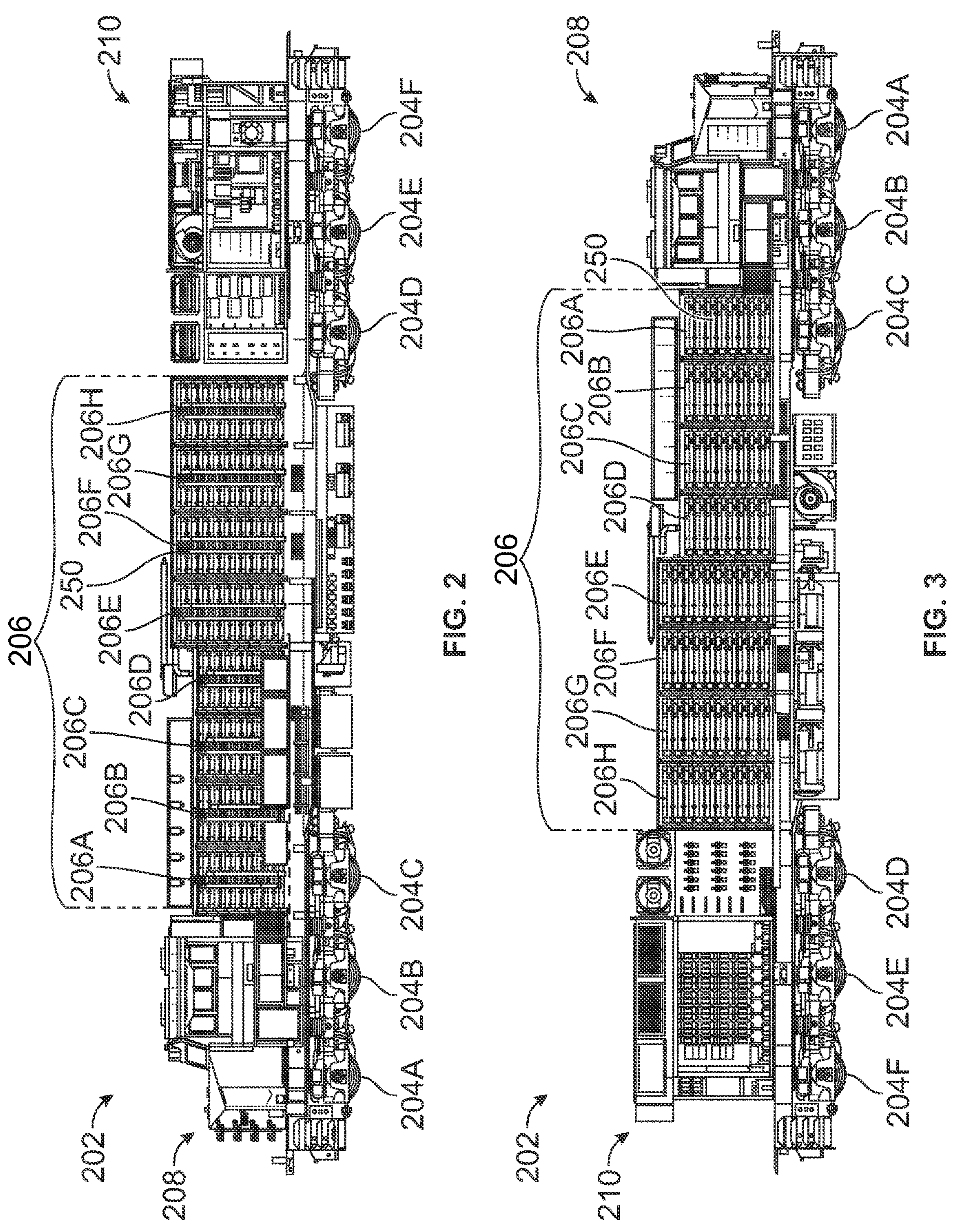
FIG. 2 illustrates a first cross-sectional side view of a vehicle, in accordance with one embodiment.
FIG. 3 illustrates a second cross-sectional side view of the vehicle shown in FIG. 2, in accordance with one embodiment.

FIG. 2 illustrates a first cross-sectional side view of a vehicle 202, in accordance with one embodiment. FIG. 3 illustrates a second cross-sectional side view of the vehicle. FIGS. 2 and 3 will be discussed together herein. In the illustrated embodiment, the vehicle is a propulsion-generating rail vehicle, but in alternative embodiments may be another type of vehicle.

The vehicle includes a first end 208 and a second end 210 with a body that extends there between. The body of the vehicle includes a frame operably coupled with plural sets of wheels 204A-F and corresponding axles. The vehicle also includes plural power sources 250 that are arranged in plural columns 206A-H. The power sources may provide electric current to the propulsion system, the auxiliary system, the braking system, or the like. In the illustrated embodiment, each of the columns 206A-D includes five power sources that are stacked on top of each other, and each of the columns 206E-H includes ten power sources that are stacked on top of each other. For example, in the illustrated embodiment, the cross-sectional view shown in FIGS. 2 and 3 shows sixty power sources that are stacked in columns and rows onboard the bogey or frame of the vehicle. Optionally, the vehicle may include additional columns of power sources, such as between a left side and right side (not shown) of the vehicle (e.g., in a direction of movement of the vehicle between the left and right side of the vehicle).

Figures 4, 5:
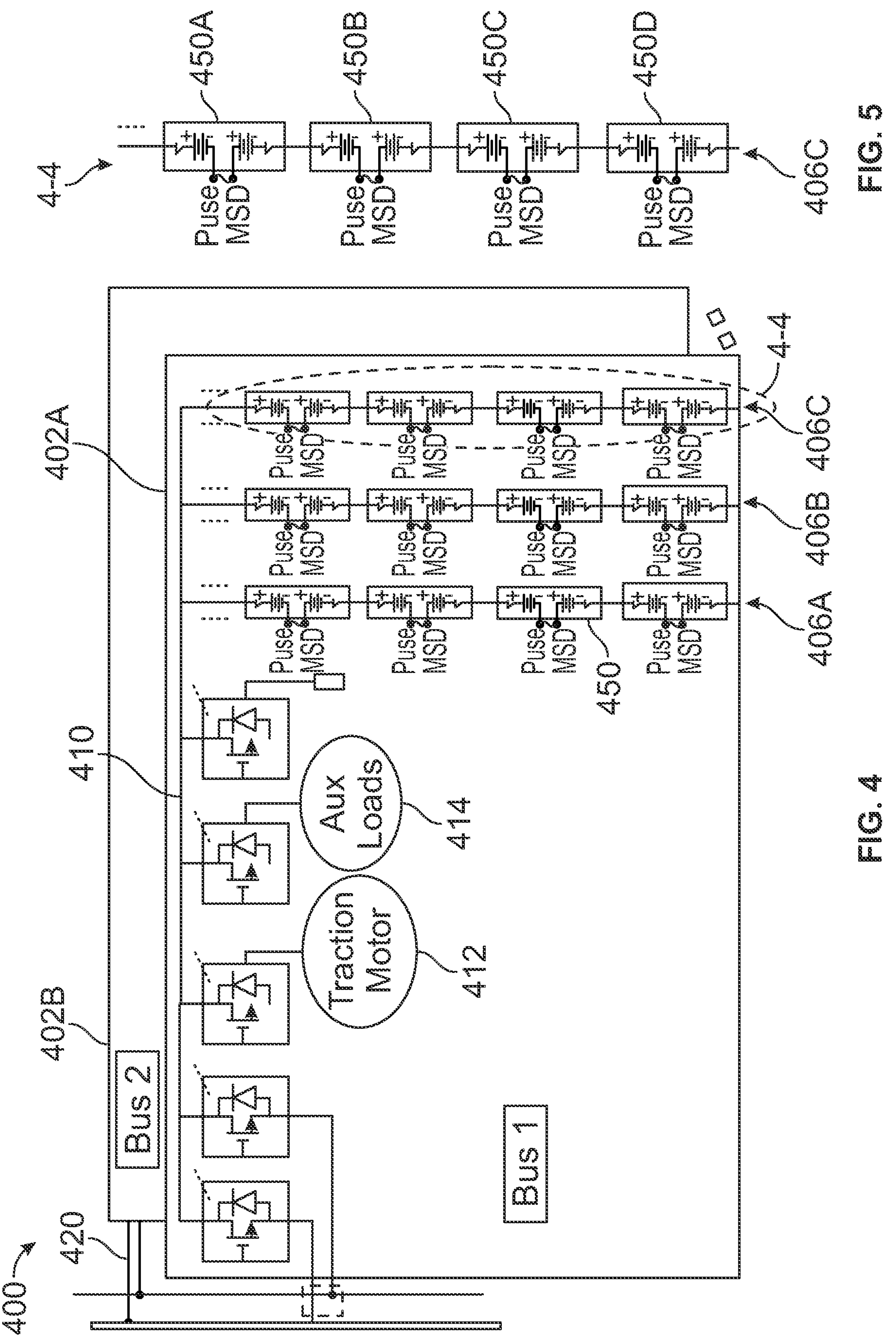
FIG. 4 illustrates a schematic of circuitry associated with power sources of a vehicle, in accordance with one embodiment.
FIG. 5 illustrates a magnified view of a string of batteries of the vehicle shown in FIG. 4, in accordance with one embodiment.

FIG. 4 illustrates a schematic 400 of circuitry associated with one or more power sources 450 or power sources of a powered system (such as the vehicle 202 illustrated in FIGS. 2 and 3), in accordance with one embodiment. The powered system includes a first power bus 402A and a second power bus 402B. Although only the electrical components of the first power bus are illustrated, the second power bus (and/or any additional buses of the powered system) may include similar electrical components. The powered system includes plural sets 406A-C of power sources 450. In the illustrated embodiment, each set includes four power sources that are coupled with each other in series. Alternatively, the power sources may be arranged in an alternative arrangement, one or more sets of power sources may include less than four or more than four power sources, the powered system may include less than three sets of power sources corresponding to each power bus, the powered system may include a single power source that is electrically coupled with the first and second power buses, or the like.

The power sources are electrically coupled with one or more auxiliary loads 414 and one or more traction motors 412 of the powered system. For example, the power sources may represent batteries or other electrical storage devices that receive, store, and provide electric current to one or more systems or components of the powered system. Two or more of the power sources may be substantially the same (e.g., have similar storage capacities, similar power ratings, similar lifespans, similar exterior casings, etc.), each of the power sources associated with each different set may be substantially the same, the power sources of the first set 406A may be substantially the same as the power sources of the second set 406B, or alternatively the power sources of the first set may be different than the power sources of the second set. Optionally, the powered system may have an alternative arrangement of common and/or unique power source(s).

FIG. 5 illustrates a magnified view of a third set 406C of power sources 450. The third set includes the power sources 450A-D arranged in series, but alternatively may include less than four or more than four power sources, arranged in parallel, arranged in a partial parallel and partial series arrangement, or any combination therein.

Figure 6:
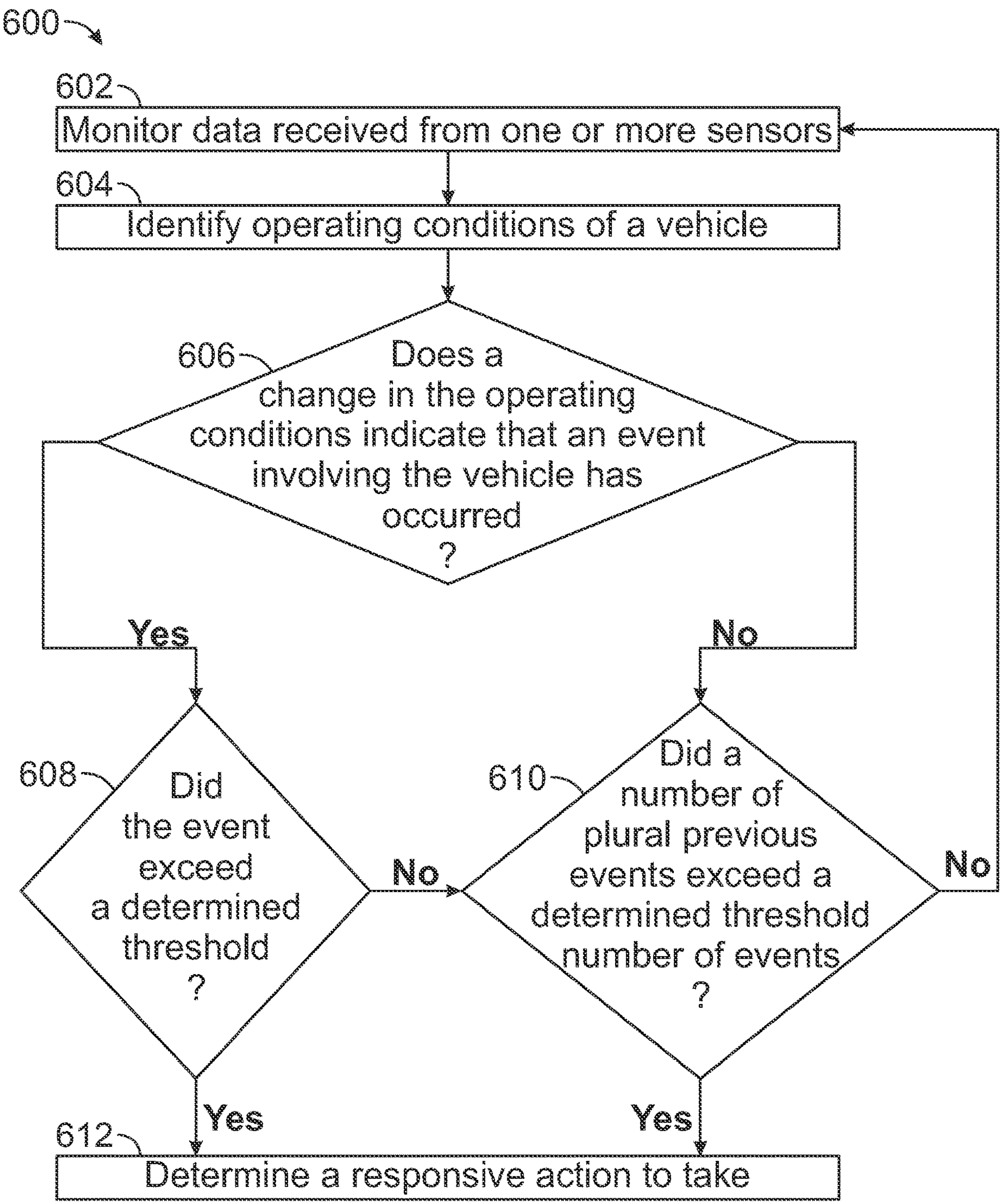
FIG. 6 illustrates a flowchart of one example of a method for monitoring and controller operation of a vehicle, in accordance with one embodiment.

FIG. 6 illustrates a flowchart 600 of one example of a method for monitoring and controller operation of a vehicle, in accordance with one embodiment. At step 602, during operation of the vehicle, the sensors (shown in FIG. 1) may detect or sense characteristics of the vehicle. The controller (and/or an off-board controller, not shown), may receive data corresponding with the sensed characteristics of the vehicle and monitor the data received from the one or more sensors. In one or more embodiments, the controller may combine or other analyze one portion of the received sensed data with another portion of the sensed data. For example, the controller may group some of the sensed data from different sensors based on a time at which the sensors obtained the data, based on different groups of corresponding sensors (e.g., a speed sensor and a GPS sensor), or the like.

At step 604, the controller may automatically identify one or more operating conditions of the vehicle. The operating conditions can include, but are not limited to, a change in wheel speed, a change in positioning, a change in inclination (e.g., such as between the first end and the second end of the vehicle), a change in acceleration, a change in rotation of one or more axles of the vehicle, or the like.

In one or more embodiments, the controller may identify one or more different operating conditions of the vehicle at different locations of the vehicle. For example, the sensors may sense vertical movement of the first end 208 of the vehicle, that is different than vertical movement of the second end 210 of the vehicle (e.g., possibly indicating that the vehicle has derailed). In another embodiment, the controller may identify the accelerometer data from a first axle (e.g., an axle onto which the first wheels 204A are operably coupled) and may analyze the data to determine corresponding accelerometer data at a location proximate to one or more of the columns 206A-H of power sources.

At step 606, the controller may determine if a change in one or more of the operating conditions of the vehicle indicates that an event has occurred that involves the vehicle. For example, the controller may receive and analyze the data from the sensors and determine if a change in operating conditions may be caused by one or more forces (e.g., unplanned and/or unexpected forces, forces that exceed a determined threshold, or the like) acting on the vehicle. Additionally or alternatively, the controller may identify a type of the event from one or more different types of events based at least in part on the data received from the one or more sensors. In one or more embodiments, the controller may determine if the change in the operating conditions indicates the event while an operator of the vehicle is off-board the vehicle (e.g., the operator is not onboard the vehicle during the event, the operator did not see the event occur, the operator did not feel forces caused by the event, or the like).

As one example, the event may be an impact event, such that the vehicle has been impacted by another object or has impacted another object (e.g., another vehicle, a stationary structure, a ground surface, etc.). As another example, the event may be a derailment event. For example, the vehicle may be a rail vehicle, and the rail vehicle may have derailed from the track along which it moves. As another example, the event may be a flooding event, such that a portion of the powered system has collected a volume of fluids (e.g., water, or the like) that may compromise the power sources and/or components of the thermal management system. As another example, the event may correspond with one or more forces (e.g., forces acting on the vehicle, force(s) that exceed a determined threshold, etc.) due to one or more of the operating conditions observed by the controller.

In one or more embodiments, the event may cause damage to one or more of the power sources disposed onboard the vehicle. For example, one or more impact events may compromise one or more of the power sources, one or more thermal management components of the vehicle, or the like. The impact event may cause damage to an exterior structure or casing of one or more of the power sources, electrical couplings between the power source(s) and other components, mounting structures of the power sources (e.g., weld joints, bolts, cracks, or the like), coolant connections of the thermal management system, mounting structures of heat sinks, or the like.

Figure 7:
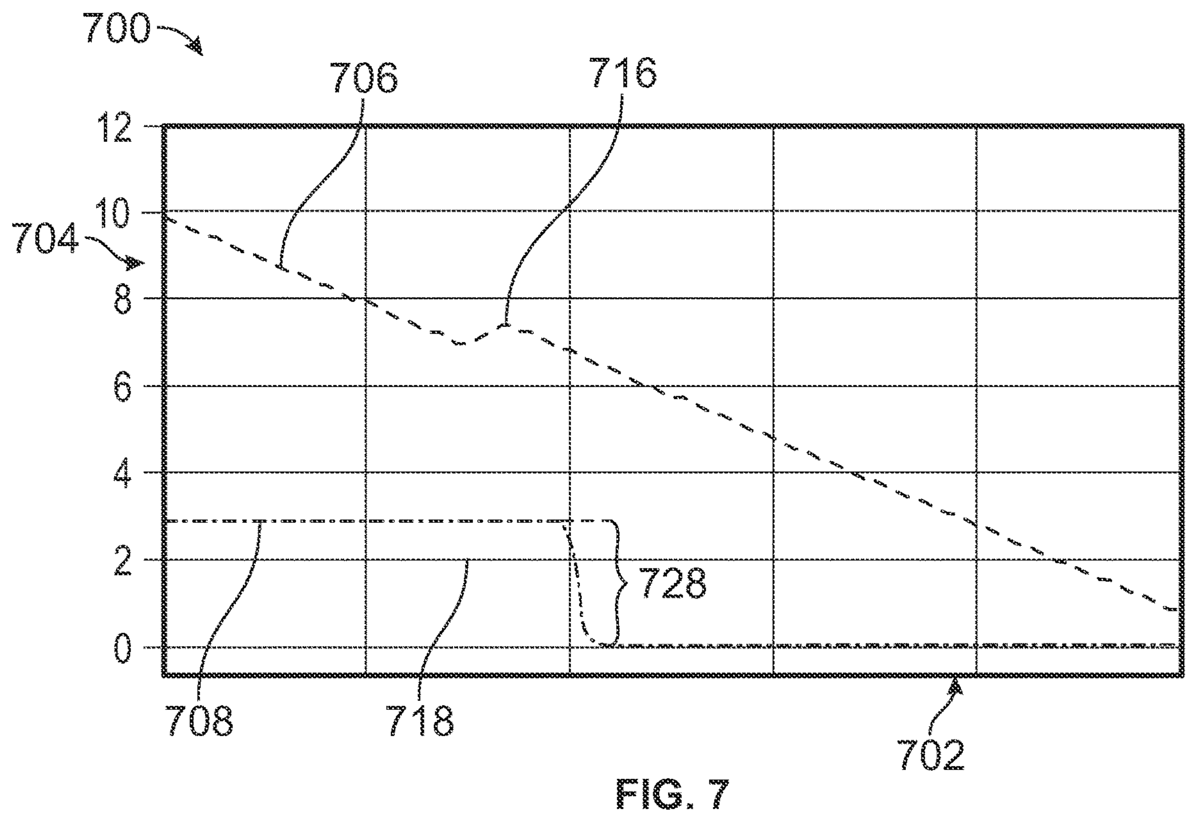
FIG. 7 illustrates a graph representing operating speeds of a vehicle indicating that no event has occurred, in accordance with one embodiment.

For example, FIG. 7 illustrates a graph 700 in which it has been determined that an event has not occurred. The graph includes a horizontal axis 702 representative of time, and a vertical axis 704 representative of speed (e.g., a speed of movement of a vehicle system including two or more vehicles mechanically coupled together). A first data line 706 is associated with a run-in event of the vehicle system. Over time, the speed at which the vehicle system is moving reduces. The first data line also includes a speed increase 716 associated with bunching and then stretching of the vehicle system as the vehicle system slows. For example, the vehicle(s) towards a rear-end of the vehicle system may bunch with vehicle(s) towards a front-end of the vehicle system in the direction of movement of the vehicle system, causing a slight increase in speed of the front-end vehicle(s) and the vehicle system. The controller may determine that an event has not occurred based at least in part on the operating conditions and/or the change in operating conditions of the vehicle system.

The graph also includes a second data line 708 is associated with a coupling event between two or more vehicles. A first vehicle may move at a low rate of speed for a predetermined length of time (e.g., while the first vehicle approaches a second vehicle to which the first vehicle is to couple). After the first vehicle reaches the second vehicle and is operably coupled with the second vehicle, movement of the first (and second) vehicles stops. The second data line includes a first rate of speed reduction 728 of the first vehicle that is within a determined acceptable threshold range. The controller may determine that an event has not occurred based at least in part on the operating conditions and/or a change in operating conditions of the vehicle system.

Figure 8:
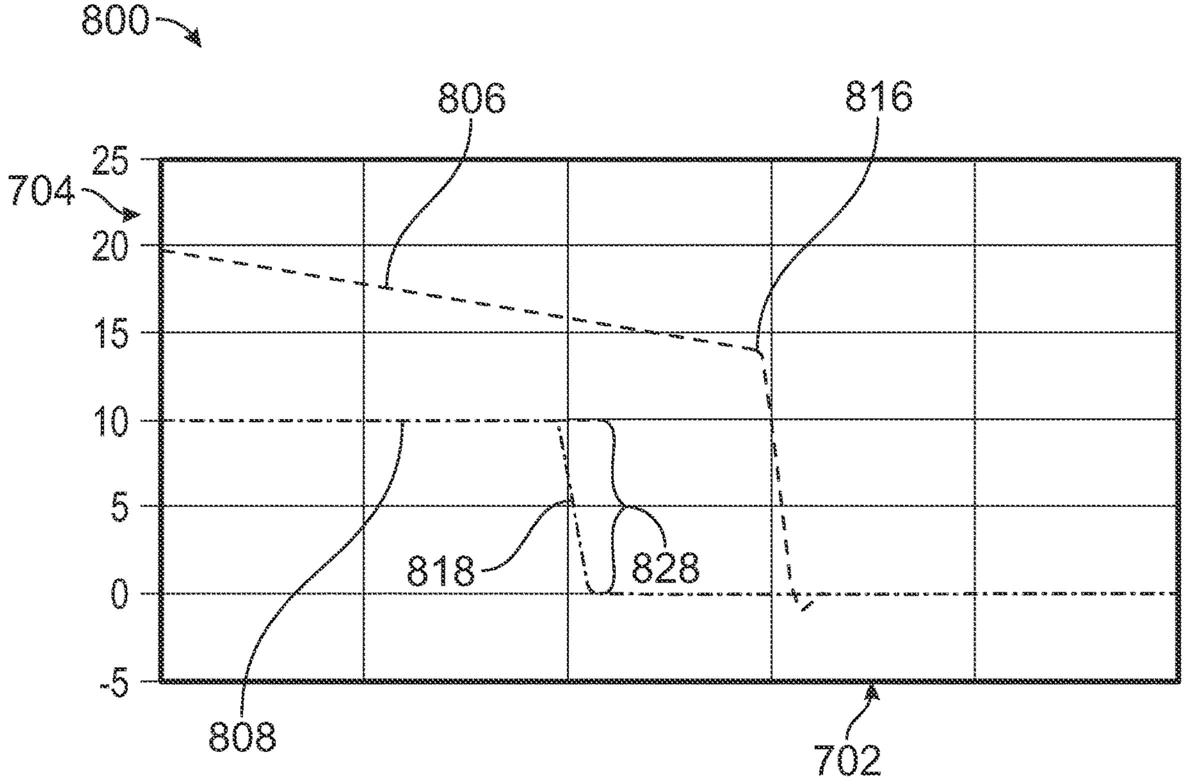
FIG. 8 illustrates a graph representing operating speeds of a vehicle indicating that one or more events have occurred, in accordance with one embodiment.

Alternatively, FIG. 8 illustrates a graph 800 in which it has been determined that an event has occurred. The graph includes the horizontal axis 702 representative of time, and the vertical axis 704 representative of speed. The graph includes an indication of two events. A third data line 806 is associated with an emergency brake application or a severe run-out or a collision, and indicates a first impact event that is associated with the emergency brake application. The third data line starts at a rate of speed that is greater than the first data line 706 illustrated in FIG. 7. The rate of speed of the vehicle system exceeds a determined threshold due to the applied emergency brake or collision at a speed reduction 816. In the present graphical example, the speed of the vehicle may also and/or alternatively changed direction.

The controller may receive the sensed data from the one or more sensors indicating the speed of the vehicle system for a first length of time, and the sensed data indicating the speed reduction, speed increase, and/or speed changes in a length of time that is less than a determined length of time. The controller may determine that the run-in event has resulted in an impact event to the vehicle system based in part on the operating conditions and/or the change in operating conditions of the vehicle system. For example, a vehicle located towards a rear-end of the vehicle system may collide with one or more vehicles located towards a front-end of the vehicle system, and the collision may have caused damage to one or more power sources. In another example, one or more vehicles with braking controls (e.g., a propulsion-generating vehicle) may apply the brakes at a level that exceeds a determined threshold, and the additional forces on the braking vehicle may have caused damage to the one or more power sources or other components or systems of the vehicle system.

A fourth data line 808 is associated with the coupling event of the two vehicles, and indicates a second impact event that is associated with the coupling event. The fourth data line starts at a rate of speed that is greater than a rate of speed of the second data line 708 shown in FIG. 7. Because the first vehicle moves at the high rate of speed (e.g., while the first vehicle approaches the second vehicle to which the first vehicle is to couple) the rate of speed of the first vehicle needs to reduce or drop at a fast rate. For example, the first vehicle approaches the second vehicle too quickly, and a second rate of speed reduction 828 of the first vehicle may be outside of the determined acceptable threshold range. The controller may receive the sensed data indicating the speed of the first vehicle, and the rate of speed reduction of the first vehicle, and may determine that the coupling event has resulted in an impact event to the vehicle system based on the operating conditions (and/or a change in operating conditions) of the vehicle system. For example, the first vehicle may have collided with the second vehicle during the coupling event.

Returning to FIG. 6, if the controller (or an off-board controller) determines that an event has occurred, flow of the method proceeds toward step 608. Alternatively, if the controller determines that an event has not occurred, flow of the method proceeds toward step 610.

At step 608, it is determined whether the event exceeded a determined threshold. For example, the controller may determine if the event is an impact event, a derailment event, a flooding event, or the like, and may have determined threshold forces that the vehicle can withstand without causing damage to the power sources, to the thermal management system components, or the like. In one or more embodiments, in the event of an event that exceeds a determined threshold, one or more of the power sources and/or one or more components of the thermal management system may have been damaged as a result of the event.

In one or more embodiments, the controller may have a list of determined thresholds that correspond with different events. In one embodiment, the event may be associated the vehicle being mechanically coupled with another vehicle, and the vehicles collided at speeds and/or forces that exceeded determined thresholds associated with coupling events. In another embodiment, the event may be associated with a derailment of the vehicle, a derailment of another vehicle of the vehicle system that puts additional stresses and strains on the vehicle, or the like. In another embodiment, the event may be associated with a run in or run out of a vehicle system. For example, plural vehicles may be mechanically coupled with each other to form a vehicle consist, and the vehicles may stretch apart from each other, or compress or bunch together, causing additional stresses and strains on the vehicle consist that may be beyond or exceed determined thresholds.

If the controller determines that the event exceeded the determined threshold (e.g., for the corresponding event that has occurred), then flow of the method proceeds toward step 612. In one or more embodiments, the controller may slow and/or stop movement of the vehicle responsive to determining that the event has exceeding the determined event threshold. Optionally, the controller may communicate a command to an operator of the vehicle to slow and/or stop movement of the vehicle. Alternatively, if the event did not exceed the determined threshold, flow of the method proceeds toward step 610.

At step 612, the controller determines a responsive action to initiate. For example, the controller may determine that the event has caused or has likely caused damage to one or more of the power sources, to one or more components of the thermal management system, or the like, and may determine a responsive action to initiate. In one embodiment, the responsive action may include disabling, warning or indicating, changing an operating status, switching or replacing, discharging, disconnecting, and/or inspecting one or more of the power sources.

In one embodiment, the controller may select the responsive action from among plural different responsive actions based at least in part on a magnitude of the impact event. For example, the controller may determine that the power sources may only need to be inspected based on an event that resulted in a first order of magnitude of forces on the vehicle. Alternatively, the controller may determine that the power sources may need to be disabled and replaced based on an event that resulted in a second, larger order of magnitude of forces on the vehicle.

In one or more embodiments, initiating the responsive action may include initiating of inspection or repair of one or more mounting components that couple the one or more onboard power sources to the vehicle. In another embodiment, the responsive action may include initiating the inspection or repair of one or more mounting components that couple one power source with another power source (e.g., two power sources stacked one on top of another in a column). In another embodiment, the responsive action may include initiating the inspection of electrical couplings, coolant connections, weld joints, bolts, cracks, or the like, of power sources, of components of the thermal management system, or the like.

In one or more embodiments, the controller may determine two or more different responsive actions associated with two or more different power sources. For example, the responsive action may be based on a location or position of the power source relative to a location of the event, a location where different forces were observed during the event, or the like. In one embodiment, the event may be an impact event that occurred at or proximate to the second end 210 of the vehicle (shown in FIGS. 2 and 3). The controller may determine and/or initiate a first responsive action for one or more of the power sources disposed in the first column 206A, and may determine and/or initiate a different, second responsive action for one or more of the power sources disposed in the ninth column 206H. In another embodiment, the controlled may determine and/or initiate different responsive actions associated with different power sources based at least in part on a position of each of the two or more power sources relative to each other, based on the types of the different power sources, based on a state of charge of each of the power sources, or the like.

In one or more embodiments, the controller may determine and/or initiate the responsive action based in part on the type of the event that has occurred. For example, if the controller determines that the event was an impact event such that the vehicle was impacted by another vehicle during coupling of the two vehicles, the controller may select a first responsive action to initiate. Alternatively, if the controller determines that the event was a derailment event such that the vehicle became separated from the track along which the vehicle moves, the controller may select a different, second responsive action to initiate.

Returning to step 606, if the change in the operating conditions does not indicate that an event has occurred, and at step 608, if the event did not exceed a determined threshold, then flow of the method proceeds toward step 610.

Figure 9:
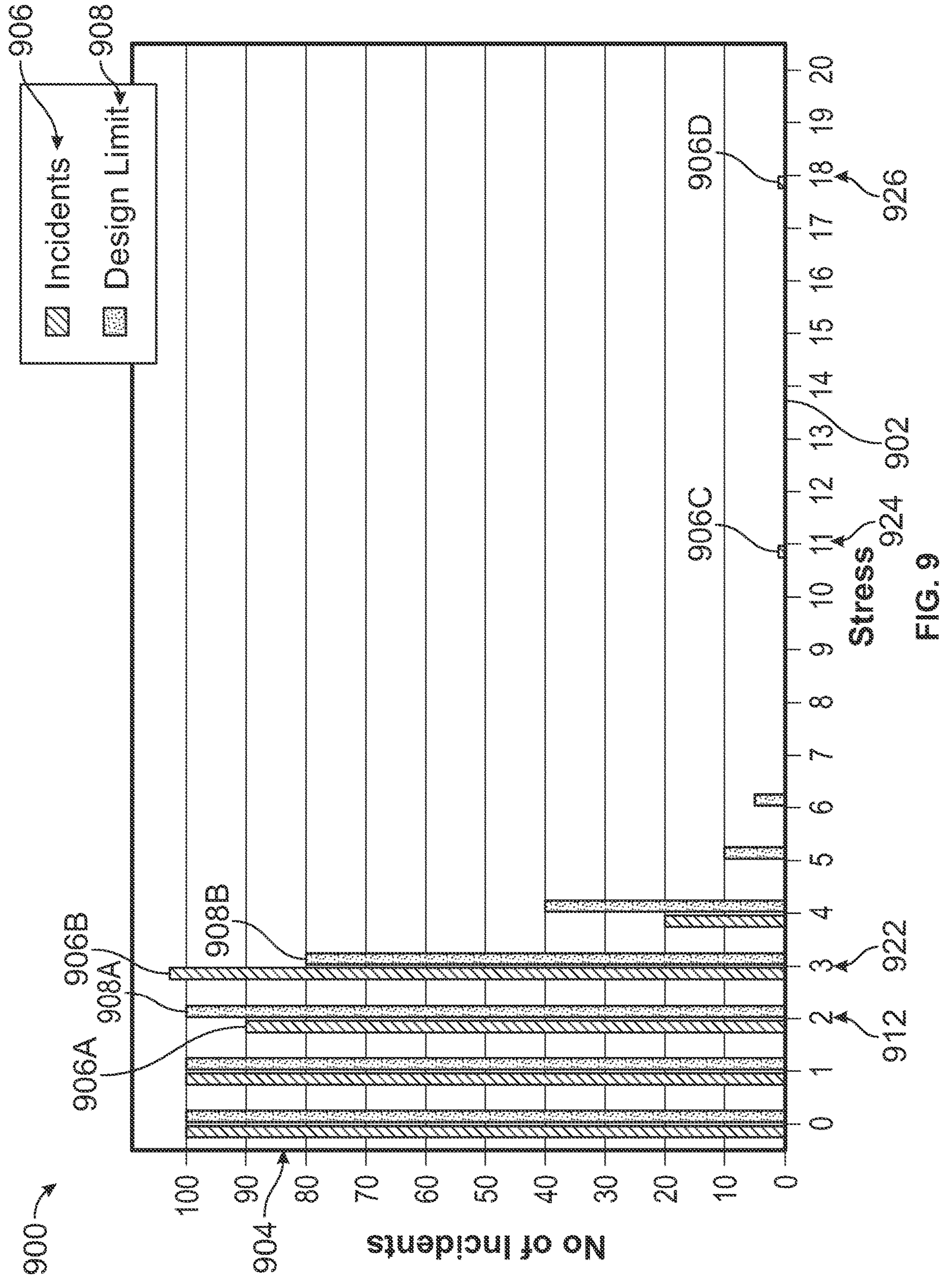
FIG. 9 illustrates a bar graph of stress levels associated with events of a vehicle, in accordance with one embodiment.

At step 610, a determination is made if a number of impact events that have occurred (e.g., over the lifespan of the vehicle, within a determined time limit such as 1 day, 1 month, 1 year, 10 years, or the like) has exceeded a determined threshold number of events. For example, a single event may not have exceeded the determined threshold that may require a responsive action, but plural events that have been determined to occur may exceed a determined threshold number of events, and a responsive action may be required. For example, FIG. 9 illustrates a bar graph 900 of stress levels associated with one or more events of a vehicle, in accordance with one embodiment. The graph includes a horizontal axis 902 representative of stress levels (e.g., stresses detected by the one or more sensors on the vehicle, on different components of the vehicle, or the like), and a vertical axis 904 representative of a number of incidents or events. These stress levels could include lateral, longitudinal and/or vertical translations and/or raw, pitch, and/or yaw rotations, or any combination of two or more therein. The stress levels could also be steady state orientation(s) of the vehicle (e.g., a vehicle slowly transitioning to a 40 degree angle or grade).

The graph includes a first set of data 906 indicating a number of incidents that have been detected or determined to have occurred, and a second set of data 908 indicating a design limit. The design limit may be based on fatigue analysis of one or more components of the power source(s) (e.g., the mounting structures, the electrical connections, or the like). For example, at a first stress level 912, the power sources may have a first design limit 908A. The controller may have determined and/or have historical information indicating that a first number of incidents 906A (e.g., within a predetermined time frame, such as the lifespan of the vehicle, the lifespan of the power source(s), 1 month, 1 year, 10 years, or the like) have occurred. As illustrated in FIG. 9, because the first number of incidents 906A is less than the first design limit 908A, at step 610, the controller may determine that the number of previous events or incidences did not exceed the determined threshold number of events, and flow of the method may return to step 602.

Alternatively, in another example, at a second stress level 922, the power sources may have a second design limit 908B. The controller may have determined and/or have historical information of previous incidents or events that a second number of incidents 906B have occurred. Because the second number of incidents 906B is greater than the second design limit 908B, the controller determines that the number of previous events exceeds the determined threshold number of events, and flow of the method proceeds toward step 612, and a responsive action is selected and/or initiated. In one or more embodiments, the responsive action may be based at least in part on the number of incidents that have occurred (e.g., a total number of events, a number of events that exceed the design limit, or the like).

As another example, at a third stress level 924 and a fourth stress level 926, the power sources (and/or one or more other components of the vehicle) may have a design limit of zero. For example, the occurrence of any event, regardless of the magnitude or forces associated with the event, exceeds the design limit associated with the third and fourth stress levels. For example, a third number of incidents 906C (e.g., a single event) at a third stress level 924 exceeds the determined threshold number of events (e.g., a design limit of zero events), and the controller may select and/or initiate a responsive action. As another example, a fourth number of incidents 906D (e.g., a single event) at a fourth stress level 926 exceeds the determined threshold number of events (e.g., a design limit of zero events), and the controller may select and/or initiate a responsive action.

In one or more embodiments, the responsive action may be based at least in part on the type and/or magnitude of the event. For example, the controller may initiate a responsive action responsive to determining that a derailment has occurred, regardless of the magnitude of the derailment. In a first derailment event, the controller may determine that a rail vehicle has come off the track along which is moves, but has not impacted a ground surface. In a second derailment event, the controller may determine that the rail vehicle has come off the track and that the rail vehicle has collided with the ground surface. In both the first and second derailment events, the controller may select and initiate a responsive action based on the event being a derailment event. Optionally, the responsive action for the first derailment event may differ from the responsive action for the second derailment event. For example, the responsive action to the first derailment event may be to send an operator to inspect the power sources. Alternatively, the responsive action to the second derailment event may be to disconnect one or more of the power sources from the electrical circuitry of the vehicle, and replace one or more of the power sources with new power sources.

In another embodiment, the controller may initiate a responsive action only after a magnitude of forces of an event are determined. For example, in a first impact event associated with a coupling event, the controller may determine that the vehicles collided while one of the vehicles was moving at a first rate of speed. In a second impact event, the controller may determine that the vehicles collided while one of the vehicles was moving at a second rate of speed that is slower or less than the first rate of speed. The controller may determine that the first impact event does not require a responsive action, but alternatively determine that the second impact event does require a responsive action.

In one or more embodiments, the controller may receive data associated with a state of a portion of a route along which the vehicle system moves. For example, the controller may receive data from sensors onboard other vehicles (e.g., vehicles that have previously traversed the portion of the route), from sensors of wayside devices, or the like. For example, the controller may receive the sensed data associated with the portion of the route before the vehicle moves along the portion of the route.

The controller may analyze the data associated with the state of the route in light of the data associated with one or more changes in the operating conditions of the vehicle. For example, the controller may determine that the portion of the route includes a damaged section, an uneven or non-level route (e.g., the portion of the route has a speed bump, plural potholes, or the like). Additionally, the controller may determine that the changes in the operating conditions of the vehicle are associated with the state of the route, and are not indicative of an event (e.g., an impact event, or the like). Alternatively, the controller may determine that the changes in the operating conditions, in light of the state of the route, exceed the determined thresholds, and may determine that a responsive action is required.

In one or more embodiments of the subject matter described herein, a method includes identifying one or more operating conditions of a vehicle based at least in part on data received from one or more sensors, and determining whether a change in the one or more operating conditions of the vehicle indicates an event involving the vehicle. A responsive action involving one or more onboard power sources of the vehicle is initiated responsive to determining the occurrence of the event.

Optionally, the event may be an impact event, a derailment event, and/or a flooding event. Optionally, initiating the responsive action may include disabling the one or more onboard power sources onboard the vehicle. Optionally, the one or more onboard power sources may include two or more onboard power sources that differ from each other. A different responsive action associated with each of the two or more onboard power sources may be initiated. Optionally, the different responsive actions may be based at least in part on a position of each of the two or more onboard power sources relative to one or more others of the two or more onboard power sources or on a type of the two or more onboard power sources or a state of charge of one or both of the two or more onboard power sources. Optionally, the method may include selecting the responsive action from among plural different responsive actions based at least in part on a magnitude of the event.

Optionally, initiating the responsive action may include initiating of inspection or repair of one or more mounting components that couple the one or more onboard power sources to the vehicle. Optionally, the one or more sensors may include one or more of an accelerometer, an inclinometer, a gyro sensor, a speed sensor, a global positioning sensor, an impact sensor, a camera, or a pressure sensor. Optionally, the method may include identifying a type of the event from one or more different types of events based at least in part on the data received from the one or more sensors. Optionally, the method may include selecting the responsive action to initiate based on the type of event. Optionally, the method may include identifying the one or more operating conditions at one or more different locations of the vehicle. Optionally, the method may include stopping movement of the vehicle responsive to determining that the event exceeded a determined threshold. Optionally, the method may include analyzing one or more operating conditions of the vehicle during plural events, and determining a responsive action based on a number of the plural events exceeding a determined threshold number of events. Optionally, the method may include receiving data associated with a state of a portion of a route along which the vehicle is configured to move, and determining whether the change in the one or more operating conditions includes the event based at least in part on the state of the portion of the route. Optionally, determining if the change in the one or more operating conditions indicates the event based at least in part on the state of the portion of the route occurs prior to the vehicle moving along the portion of the route. Optionally, the method may include determining if the change in the one or more operating conditions of the vehicle indicates the event while an operator of the vehicle is off-board the vehicle.

In one or more embodiments of the subject matter described herein, a system includes a controller having one or more processors to control operation of a vehicle. The controller identifies one or more operating conditions of the vehicle based at least in part on data received from one or more sensors. The controller determines whether a change in the one or more operating conditions of the vehicle indicates an event involving the vehicle. The controller initiates a responsive action involving one or more onboard power sources of the vehicle responsive to determining the occurrence of the event.

Optionally, the controller may disable the one or more onboard power sources responsive to determining the occurrence of the event. Optionally, the controller may select the responsive action from among plural different responsive actions based at least in part on a magnitude of the event.

In one or more embodiments of the subject matter described herein, a method includes identifying an occurrence of an event to a vehicle configured to move along a route. The vehicle includes one or more onboard electric power sources. The event may be an impact event, a derailment event, and/or a flooding event. A responsive action is determined responsive to identifying the occurrence of the event. The responsive action includes one or more of an inspection or maintenance to the one or more onboard electric power sources.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in another device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:

Identifying, by a controller, one or more operating conditions of a vehicle based at least in part on data received from one or more sensors;

determining, by the controller, whether a change in the one or more operating conditions of the vehicle indicates an event involving the vehicle;

initiating, by the controller, a responsive action involving one or more onboard power sources of the vehicle responsive to determining occurrence of the event; and stopping a movement of the vehicle, by the controller controlling an operation of a braking system of the vehicle, in response to determining that the event exceeded a determined threshold, wherein the one or more onboard power sources include two or more onboard power sources that differ from each other, and further comprising initiating, by the controller, a different responsive action associated with each of the two or more onboard power sources, and wherein the different responsive actions are based at least in part on a position of each of the two or more onboard power sources relative to one or more others of the two or more onboard power sources or on a type of the two or more onboard power sources or a state of charge of one or both of the two or more onboard power sources.

2. The method of claim 1, wherein the event is one or more of an impact event, a derailment, or a flooding event.

3. The method of claim 1, wherein initiating the responsive action includes disabling, by the controller, the one or more onboard power sources onboard the vehicle.

4. The method of claim 1, further comprising selecting, by the controller, the responsive action from among plural different responsive actions based at least in part on a magnitude of the event.

5. The method of claim 1, wherein initiating, by the controller, the responsive action includes initiating of inspection or repair of one or more mounting components that couple the one or more onboard power sources to the vehicle, by the controller.

6. The method of claim 1, wherein the one or more sensors include one or more of an accelerometer, an inclinometer, a gyro sensor, a speed sensor, a global positioning sensor, an impact sensor, a camera, or a pressure sensor.

7. The method of claim 1, further comprising identifying, by the controller, a type of the event from one or more different types of events based at least in part on the data received from the one or more sensors.

8. The method of claim 7, further comprising selecting, by the controller, the responsive action to initiate based on the type of the event.

9. The method of claim 1, further comprising identifying, by the controller, the one or more operating conditions at one or more different locations of the vehicle.

10. The method of claim 1, further comprising analyzing, by the controller, the one or more operating conditions of the vehicle during plural events, and determining a responsive action based on a number of the plural events exceeding a determined threshold number of events.

11. The method of claim 1, further comprising:

receiving, by the controller, data associated with a state of a portion of a route along which the vehicle is configured to move; and determining, by the controller, whether the change in the one or more operating conditions indicates the event based at least in part on the state of the portion of the route.

12. The method of claim 11, wherein determining, by the controller, if the change in the one or more operating conditions indicates the event based at least in part on the state of the portion of the route occurs prior to the vehicle moving along the portion of the route.

13. The method of claim 1, further comprising determining, by the controller, if the change in the one or more operating conditions of the vehicle indicates the event while an operator of the vehicle is off board the vehicle.

14. A system, comprising:

a controller including one or more processors configured to control operation of a vehicle, the controller configured to identify one or more operating conditions of the vehicle based at least in part on data received from one or more sensors, the controller configured to determine whether a change in the one or more operating conditions of the vehicle indicates an event involving the vehicle, the controller configured to initiate a responsive action involving one or more onboard power sources of the vehicle responsive to determining occurrence of the event, and the controller configured to stop a movement of the vehicle, by controlling an operation of a braking system of the vehicle, in response to determining that the event exceeded a determined threshold, wherein the one or more onboard power sources include two or more onboard power sources that differ from each other, wherein the controller is configured to initiate a different responsive action associated with each of the two or more onboard power sources, and wherein the different responsive actions are based at least in part on a position of each of the two or more onboard power sources relative to one or more others of the two or more onboard power sources or on a type of the two or more onboard power sources, or a state of charge of one or both of the two or more onboard power sources.

15. The system of claim 14, wherein the controller is configured to disable the one or more onboard power sources responsive to determining the occurrence of the event.

16. The system of claim 14, wherein the controller is configured to select the responsive action from among plural different responsive actions based at least in part on a magnitude of the event.

17. A method, comprising:

identifying, by a controller, an occurrence of an event to a vehicle configured to move along a route, the vehicle including one or more onboard electric power sources, the event being one or more of an impact event, a derailment event, or a flooding event;

disconnecting, by the controller, one or more of the onboard electric power sources from electrical circuitry of the vehicle; and determining, by the controller, a responsive action responsive to identifying the occurrence of the event, the responsive action including one or more of inspection or maintenance to the one or more onboard electric power sources, wherein the one or more onboard power sources include two or more onboard power sources that differ from each other, and further comprising initiating, by the controller, a different responsive action associated with each of the two or more onboard power sources, and wherein the different responsive actions are based at least in part on a position of each of the two or more onboard power sources relative to one or more others of the two or more onboard power sources or on a type of the two or more onboard power sources or a state of charge of one or both of the two or more onboard power sources.

* * * * *